United States Patent [19]

Aoyama

[11] 4,404,626

[45] Sep. 13, 1983

[54] POSITIONING CONTROLLING METHOD

[75] Inventor: Tadamasa Aoyama, Yokohama, Japan

[73] Assignee: Kabushiki Kaisha Sanesu Shoko, Yokohama, Japan

[21] Appl. No.: 230,499

[22] Filed: Feb. 2, 1981

[51] Int. Cl.³ .............................................. G05B 13/02
[52] U.S. Cl. .................................... 364/174; 318/561;
318/615; 364/167; 364/183; 364/176
[58] Field of Search ............... 364/183, 474, 475, 148,
364/153, 167, 170, 174, 176, 177, 511; 318/561,
611, 612, 615, 630, 632, 650

[56] References Cited

U.S. PATENT DOCUMENTS

| 3,629,560 | 12/1971 | Slawson | 364/174 X |
| 3,739,158 | 6/1973 | Woodward | 364/174 X |
| 4,064,444 | 12/1977 | Hoang | 318/561 |
| 4,218,956 | 8/1980 | Uno et al. | 364/174 X |
| 4,250,438 | 2/1981 | Onoda | 364/174 X |
| 4,311,945 | 1/1982 | Aoyama | 318/615 X |

Primary Examiner—Joseph F. Ruggiero
Attorney, Agent, or Firm—L. Lawton Rogers, III

[57] ABSTRACT

A method and apparatus for controlling the deceleration of a motor driven body in which deceleration is controlled as a function of the difference between the output energy of the driving motor and the kinetic energy of the driven body.

6 Claims, 4 Drawing Figures

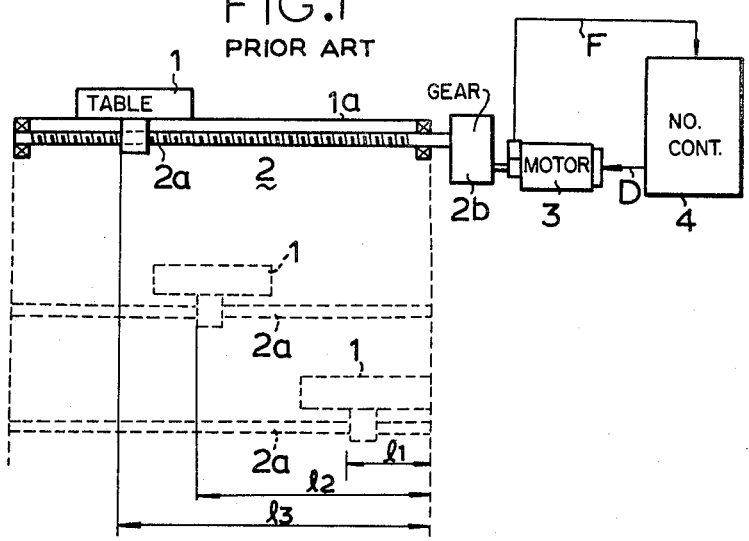
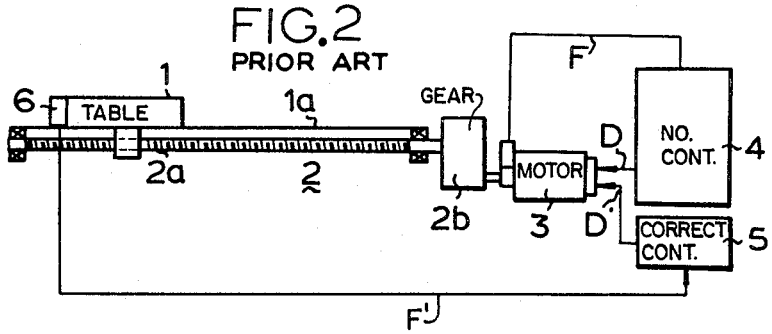

POSITIONING CONTROLLING METHOD

DETAILED DESCRIPTION OF THE INVENTION

The present invention relates to a controlling method for controlling the positioning of a moving body such as a tool base of a machine tool or the like.

BRIEF DESCRIPTION OF THE DRAWINGS

FIG. 1 is an illustration of a conventional semi-closed-loop type positioning controlling system;

FIG. 2 is an illustration of a semi-closed-loop type of the same type as that shown in FIG. 1 but having a correcting control system;

1—table, 2—transmission mechanism, 3—servo motor, 4—numerical controller, 6—length detector, 7—distance counter, 8—clock, 9—speed counter, D—driving signal of motor 3, F—feedback signal, T—time pulse signal.

Figure 3:
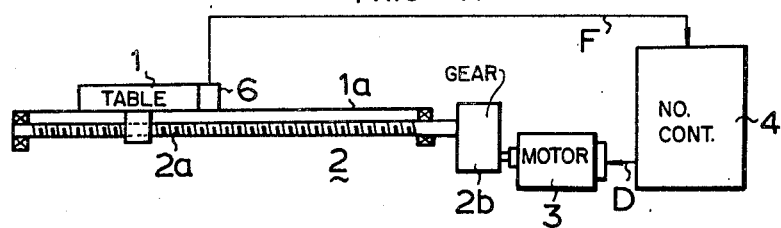
FIG. 3 is an illustration of a conventional closed-loop type positioning controlling system.

Controlling methods as shown in FIGS. 1 to 3 have been known heretofore, as the positioning controlling method for machine tools or the like.

Referring first to FIG. 1 showing so-called semi-closed-loop control system, a reference numeral 1 designates a moving body to be positioned, e.g. a table, 2 designates a transmission mechanism for operatively connecting the moving body 1 to a driving source such as a pulse motor 3, the transmission mechanism including a ball nut screw 2a (referred to simply as ball screw) and a reduction gear 2b, and a reference numeral 4 designates a numerical controller.

In this controlling system, a driving signal D is imparted to the pulse motor 3 in accordance with a pulse command signal which is supplied from a tape reader or the like, while a feedback signal F representing the rotation speed (angle) of the output shaft of the pulse motor 3 is fed back to the controller 4.

The numerical controller 4 compares the command signal with the feedback signal F to make the positioning of the table 1. Thus, the control of the positioning of the table is performed with a parameter of rotation speed (angle) of the pulse motor 3 as the driving source.

In this controlling system shown in FIG. 1, the pulse motor 3 as the driving source is controlled in accordance with the result of comparison between the command signal for controlling the rotation speed (angle) of the shaft thereof and the feedback signal representing the actual shaft rotation speed (angle) derived directly from the shaft. Since the rotation speed (angle) of the motor 3 is controlled by the command pulse, and, particularly, since the rotation speed (angle) of the motor 3 can be controlled minutely, the control of deceleration or stopping of the motor itself can be performed easily.

The minute and exact control of the motor speed (angle) solely, however, cannot provide the prompt and exact control of positioning of the table 1 as the control object. Namely, in the control system shown in FIG. 1, the error of present position of the table caused by the back lash of the transmission mechanism 2, play of the table 1 and so forth cannot be detected, because the control of position of the table 1 is made in terms of the rotation velocity (angle) of the pulse motor.

In order to avoid the above-described problem of the prior art, a control system as shown in FIG. 2 has been proposed and put into practical use. In this system, a correcting feedback signal F' is derived from a detector 6 provided on the table 1 of the same system as that shown in FIG. 1. This signal is compared with a programmed position signal by a correcting controller 5 provided in the numerical controller 4. The correcting controller 5 then delivers a correcting control signal D' to the pulse motor 3 in accordance with the result of the comparison. This improved system, however, involves a problem that time length required for the positioning is inconveniently prolonged because of necessity of correction, as well as a problem of too complicated construction of the system.

FIG. 3 shows another known control system which is a closed-loop control system in which the feedback signal F is directly derived from a detector 6 on the table 1 and is fed back to the numerical controller 4.

The control system shown in FIG. 3 is a perfect closed system because the control signal D delivered by the controller 4 to the motor 3 is determined in accordance with the programmed position of the table 1 itself, whereas the present position of the table 1 is detected directly from the actual position of the table 1. Clearly, this system is more perfect from the view point of control logic as compared with the control systems shown in FIGS. 1 and 2 in which the rotation speed (angle) of the pulse motor 3 is controlled in place of the table position. Unfortunately, however, there are only few systems of the type shown in FIG. 3 which have been put into practical use.

The reason why only few systems of the closed-loop type shown in FIG. 3 for controlling positioning of a moving body such as a table have been put into practical use is as follows.

Namely, in the control system as shown in FIG. 3, the table 1 receives the rotational output of the motor 3 through a transmission mechanism 2 and is moved along a sliding surface 1a while being accompanied by the operation of the transmission mechanism 2. The movement of the table 1, however, is affected by various factors such as the clearance between the table 1 and the sliding surface 1a, lubricating oil in the above-mentioned clearance, load imposed on the transmission mechanism and the sliding surface 1a during the movement of the table 1, distortion of constituents attributable to the load, mechanical plays, back lash and other mechanical errors involved by the operating portions including the transmission mechanism 2, and so forth.

Therefore, even if the output of the motor 3 is controlled in accordance with the present position of the table directly fed back from the latter, it is extremely difficult to position the table 1 at the programmed position, particularly to stop the same exactly at the programmed position.

Namely, it is extremely difficult or practically impossible to correctly position the table 1 at the programmed position, unless the above-mentioned various factors concerning the transmission mechanism 2 and so forth between the table 1 and the motor 3 are eliminated.

The aforementioned factors hampering the correct positioning of the table 1 at the programmed position are involved also by the control systems shown in FIGS. 1 and 2, and cannot be eliminated as long as the systems include machine. Therefore, it is extremely difficult to exactly stop the table 1 at the programmed position, also in the control systems shown in FIGS. 1 and 2, because of the presence of the aforementioned factors hampering the positioning.

Various measures have been taken to reduce the influence of the above-mentioned factors hampering the positioning, such as the use of ball screw having small back lash in the transmission mechanism 2, increase of the rigidity of the ball screw, and increase of the whole mechanical system to reduce the distortion. These measures, however, cannot solve the problem perfectly.

For instance, assuming here that a ball screw 2a having a sufficiently high rigidity is used in the mechanical system of control system shown in FIG. 1, the actual length of the portion receiving the load varies between $l_1$ and $l_3$ as shown by chain line in FIG. 1, depending on the position of the table 1 on the sliding surface 1a. If a constant torque is imparted from the motor 3 to the ball screw 2a having varying actual load receiving length 2a, the output of the motor 3 is transmitted to the table 1 under the influence of the strain or distortion of the screw 2a which varies in accordance with the change of the above-mentioned load receiving length. Therefore, it is not possible to control the table 1 constantly by the motor irrespective of the position of the table 1. The same applies also to the distortion of the sliding surface 1a during operation of the machine.

In the conventional control systems, the output of the motor 3 is controlled to decrease the moving velocity of the table 1 to decelerate and stop the table 1. The control of the output of motor 3 is made continuously while observing the present moving velocity to confirm whether the present moving velocity coincides with the programmed one. Therefore, the varying load of the driven side including the table due to the deceleration is imposed on the motor to the moment immediately before the stopping. To the contrary, from the standpoint of the driven side including the table 1, the driven side receives the output of the motor 3 which is continuously varied in accordance with the control, to successively vary the inertia.

The change of the motor output and the inertia of the driven side including the table during the deceleration is affected by the aforementioned factors hampering the positioning, so that the above-mentioned change does not occur at a constant rate. A minute observation of the decelerating state will show that the velocity is decreased gradually while repeating fine or minute acceleration and deceleration, so that the driven side including the table is decelerated to the moment immediately before the stopping leaving a distortion or strain, while repeating minute or fine increase and decrease of the inertia.

The fact that the table 1 is decelerated while repeating minute increase and decrease of the inertia means that the distortion or strain generated in the machine side due to the inertia remains in the machine side to the moment immediately before the stopping at varying level. At the instant at which the table is stopped completely, this residual strain or distortion is released because the inertia is nullified at that instant, so that the stopping position of the table is inconveniently offset from the designated one.

The distortion appearing in the machine side during the deceleration is serious particularly when the mass or weight of the driven side including the table is large or when the table moving at a constant velocity is decelerated abruptly. In such a case, it is difficult even to stop the table temporarily at the designated position. Namely, the unfavourable "over-run" is inevitable.

In view of the present state of numerical control technics for positioning an object, the present invention aims as its object at providing a positioning controlling method which permits a prompt and highly precise positioning of the moving body such as a table by a feedback signal directly derived from the moving body, irrespective of whether a transmission mechanism is interposed between the moving body and the driving source such as a motor and irrespective of the precision and rigidity of the transmission mechanism if the latter is involved, and which is easy to put into practical use.

To this end, according to the invention, there is provided a positioning controlling method for controlling the positioning of a moving body such as a table having the steps of deriving the present amount of movement representing the present position of the moving body directly from a detector mounted on the moving body, comparing the derived present position signal with a programmed position signal representing the programmed amount of movement concerning a deceleration point including the stopping position of the moving body, and controlling the output of the driving source of the moving body such as a motor to decelerate or stop the moving body, wherein the improvement comprises forming a present velocity signal representing the present velocity of the moving body from the present position signal in relation to a suitable time signal, controlling the output of the driving source in accordance with the result of the comparison such that the present velocity signal coincides with the programmed velocity signal, detecting, when the present velocity of the moving body coincides with any desired programmed velocity, the time at which the output energy of the driving source coincides with the energy possessed by the driven side including the moving body and delivering a driving signal for a deceleration including the stopping of the moving body to the driving source, at the instant at which both energies have become substantially equal to each other or immediately after that instant.

The controlling method of the invention will be described hereinafter with reference to the accompanying drawings.

The system embodying the controlling method of the invention is identical to the closed-loop control system shown in FIG. 3 in that a servo motor 3 is controlled in accordance with the result of a comparison between a programmed position and the present position of the table 1 obtained from a signal F directly derived from the table 1. Therefore, in FIG. 4 showing the system in accordance with the invention, the same reference numerals are used to denote the same parts or members as those of the system shown in FIG. 3.

Figure 4:
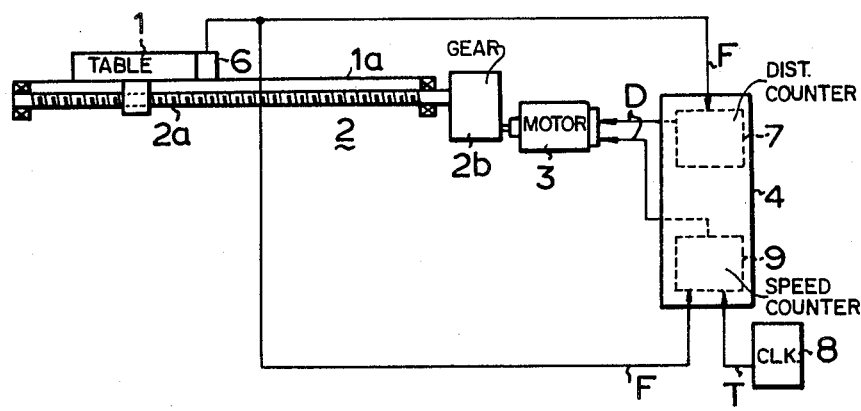
FIG. 4 is an illustration of a positioning controlling system in accordance with an embodiment of the invention.

Referring to FIG. 4, a reference numeral 1 designates a table as the moving body, whereas a reference numeral 2 designates a transmission mechanism including a feed screw 2a, reduction gear 2b and so forth and interposed between the table 1 and a driving source which is in this case a D.C. servo motor 3. A reference numeral 4 designates a numerical controller.

The present position of the table 1 is derived from a length detector 6 which is disposed over the table 1 and the sliding surface 1a and adapted to produce one distance pulse per 0.01 mm displacement of the table 1. The pulse signal F thus derived is supplied to a distance counter 7 which will be mentioned later. The programmed position concerning the deceleration or stopping of the aforementioned table 1 is preset in the distance counter 7 provided in the numerical controller 4, in terms of a numeral representing the distance from an origin point determined on the sliding surface 1a. The distance counter 7 may be a subtracting counter. In such a case, the present position of the table 1 is expressed as the value remaining in the counter 7.

The driving signal D of the servo motor 3 is supplied in the form of an increase or decrease of voltage, on the basis of the value remaining in the counter 7 representing the distance to the point of deceleration or stopping preset in the counter 7. This signal D is preset in the numerical controller 4 such that a voltage sufficient to decrease the speed of the table 1 at a predetermined deceleration rate at the point of deceleration or stopping, thereby to decelerate or stop the table 1 at that point.

The distance pulse signal F derived from the length detector 6 is delivered to a velocity counter 9 which receives also a time pulse signal delivered by a clock 8, and is reformed into a present speed signal representing the present speed of the table 1, in relation to the time pulse signal T. This present speed signal is formed by counting the distance pulse received in a predetermined time length, counting the time pulse signal T received during the travel of the table 1 over a predetermined distance or by counting both of the pulses mentioned above.

The programmed speed of the table 1 preset as stated before is stored in the numerical controller, such a form as to permit the comparison with the present speed signal, so that the present speed of the table 1 is compared in the numerical controller 4 with the programmed speed. The numerical controller 4 then delivers the driving signal D to the servo motor 3 in accordance with the result of the comparison to make the present speed of the table coincide with the programmed speed.

The above-explained manner of operation is materially identical to that performed by the known controlling system. The invention, however, has a novel feature over the known system concerning the control in the period between the start of deceleration of the table 1 and the stopping of the same.

According to the invention, during the deceleration of the table 1 from the instant at which the deceleration is commenced to the complete stopping of the table 1, the distortion or strain in the driven system including the table 1 is positively reduced and the motor 3 is controlled to decelerate the table 1 upon detection of the instant at which the strain or distortion is reduced. Furthermore, the strain or distortion of the driven side is decreased to a negligibly small level at an instant immediately before the stopping to stop the table 1 precisely and promptly.

The means for decelerating the table 1 while reducing or eliminating the strain of the driven side can have the following arrangement.

Generally, as the table is decelerated from the constant running speed, the inertia generated in the driven side including the table 1 by the constant running speed is absorbed by a servo amplifier through the rotor of the motor 3 and is radiated as heat from the amplifier, so that the inertia is gradually decreased.

From the standpoint of the table 1, the operation of the motor during the deceleration is as follows.

At the beginning period of the deceleration, the motor 3 acts as a brake and, thereafter, as a traction driving source for decelerating the table 1. In other words, at the beginning period of the deceleration, the kinetic energy of the driven side including the table 1 exceeds the output energy of the motor 3 and, thereafter, the kinetic energy of the driven side is reduced down to the level of the output energy of the motor. This means that, in this transient period, there is an instant at which the kinetic energy of the driven side comes to equal to the output energy of the motor 3.

Therefore, the deceleration of the driven side including the table 1 can be achieved in a more effective manner by detecting the instant at which the kinetic energy of the driven side and the output energy of the motor have come to be equal to each other and delivering the next decelerating signal to the motor 3 at that instant. Thus, the table 1 can be decelerated effectively and promptly if this deceleration control is made at least twice, during the deceleration.

The instant at which the kinetic energy of the driven side comes to equal to the output energy of the motor 3 is the instant at which the strain or distortion of the driven side is small. Therefore, if the above-explained deceleration control in accordance with the invention is used when the table has come to the position immediately before the programmed stopping position, the table can be precisely stopped at the programmed stopping position without causing the offset of the stopping position attributable to the release of the strain or distortion.

Hereinafter, an explanation will be made as to the means for detecting the instant at which the levels of the kinetic energy of the driven side and the output energy of the motor 3 equal each other.

The present speed of the table 1 is continuously detected even after the deceleration is commenced, by the speed counter 9. Therefore, by observing the content of the counter 9 by naked eyes or by an electric means, it is possible to detect the above-mentioned instant.

This is because the content of the speed counter 9 fluctuates due to fluctuation of the output of the motor 3 before and after the above-mentioned instant, but there is no fluctuation at the instant at which the levels of both energies are equal.

A deceleration signal or a stopping signal is delivered simultaneously with the detection of the above-mentioned instant.

In the embodiment described heretofore, the instant at which the levels of both energies come to be equal to each other is detected by means of the speed counter 9. This instant, however, can be detected through an observation of the feedback signal coming from the length detector 6.

In this case, a driving signal which is large enough to reverse the table 1 is delivered to the motor 3 to decelerate the table 1. Then, the instant at which the table 1 actually starts to reverse is detected. This detection is made through the length detector 6 which generates a reversed feedback signal at that instant. Simultaneously with the detection, a driving signal in the forward direction is momentarily imparted to the motor 3 to stop the latter.

More specifically, since the deceleration of the table 1 is made in such a manner as to nullify the inertia of the driven side by the output of the motor 3, so that, at the instant at which the motor 3 starts to rotate in the reverse direction, there is no apparent load imposed on the motor 3. In other words, the inertia of the driven side which has been decelerated has become small to sufficiently reduce the strain or distortion, so as to permit an extremely precise stopping of the table 1.

The deceleration and stopping effect as achieved by the controlling method of the invention can be obtained irrespective of whether a transmission mechanism such as a feed screw is interposed between the moving body such as the table and the driving source.

Since the table is decelerated and stopped by such a control of the output of the driving source as to minimize the strain or distortion of the driven side including the table at the position before the programmed stopping position, it is possible to effect the positioning control by a closed-loop system which has not been heretofore used so frequently because of the impracticality.

According to the invention, such a state is created during the deceleration or before the moving body reach the programmed stopping position that no influence is caused or negligibly small influence is caused by the transmission mechanism, irrespective of the precision of the mechanism, in the control of stopping of the moving body. It is, therefore, possible to achieve a highly precise control of stopping. In addition, since the precision of the transmission mechanism does not affect the precision of the control, it is not necessary to ball screw or the like precise mechanism as the transmission mechanism to offer various advantages such as possibility of numerical control of general purpose machines by so-called retro-fit.

I claim:

1. Apparatus for controlling the deceleration of a motor driven body comprising:
   means for detecting the present velocity of the body and for providing a first signal representative thereof;
   means for detecting the present position of the body and for providing a second signal representative of the desired velocity of the body at the detected position;
   means for comparing said first and second signals to provide an error signal and for controlling the motor driving the body in response thereto;
   means for applying a first deceleration signal to the motor driving the body; and
   means for detecting the instant at which the output energy of the motor driving the body equals the kinetic energy of the body and for applying a second deceleration signal to the motion driving the body in response thereto,
   whereby the strain on the body is reduced and the precision of control of the body enhanced.

2. The apparatus of claim 1 wherein said means for detecting the instant of equal motor output and body kinetic energies includes means for detecting fluctuations in the actual velocity of the body.

3. The apparatus of claim 1 wherein said means for detecting the instant of equal motor output and body kinetic energies includes means for detecting reversal in the direction of movement of the body and for applying a forward driving signal to the motor in response thereto.

4. A method of controlling the deceleration of a motor driven body comprising the steps of:
   (a) detecting the present velocity of the body and providing a first signal representative thereof;
   (b) detecting the present position of the body and providing a second signal representative of the desired velocity of the body at the detected position;
   (c) comparing said first and second signals to provide an error signal and controlling the motor driving the body in response thereto;
   (d) applying a first deceleration signal to the motor driving the body; and
   (e) detecting the instant at which the output energy of the motor driving the body equals the kinetic energy of the body and applying a second deceleration signal to the motor driving the body in response thereto,
   whereby the strain on the body is reduced and the precision of control enhanced.

5. The method of claim 4 wherein the step of detecting the instant of equal motor output and body kinetic energies includes the step of detecting fluctuations in the actual velocity of the body.

6. The method of claim 4 wherein the step of detecting the instant of equal motor output and body kinetic energies includes the steps of detecting a reversal in the direction of movement of the body and applying a forward driving signal to the motor in response thereto.

* * * * *